June 14, 1932.  C. H. MARTIN  1,863,120
FIFTH WHEEL APPARATUS
Filed Aug. 16, 1930
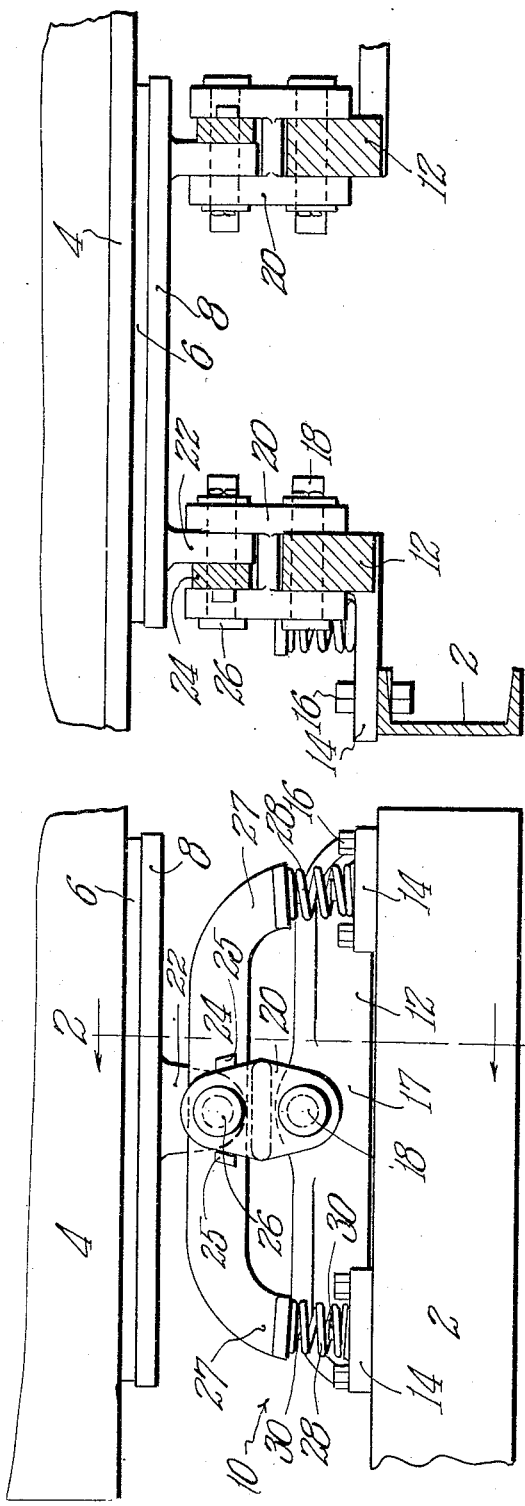
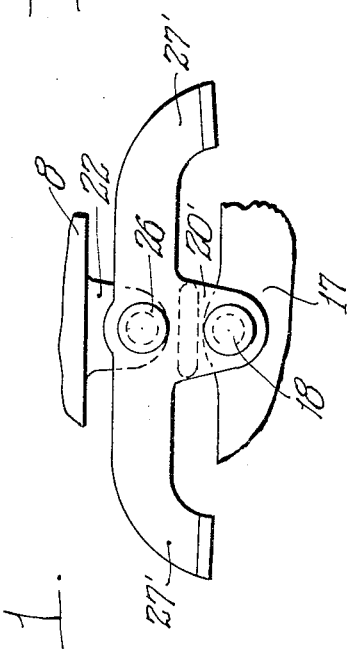
INVENTOR.
Charles H. Martin
BY
ATTORNEYS.

Patented June 14, 1932

1,863,120

UNITED STATES PATENT OFFICE

CHARLES H. MARTIN, OF WEST SPRINGFIELD, MASSACHUSETTS

FIFTH WHEEL APPARATUS

Application filed August 16, 1930. Serial No. 475,681.

This invention relates to improvements in fifth-wheel apparatus and is directed more particularly to improvements to resilient mountings therefor.

The principal object of the invention is the provision of a mounting for fifth-wheel apparatus wherein cushioning means are provided to absorb shocks and strains thereof which is devoid of sliding or frictionally engageable parts.

In connection with fifth-wheel apparatus it has been customary to provide cushioning mechanism including relatively slidable or frictionally engageable parts. Due, however, to the service to which such apparatus is subjected the parts soon become clogged with dirt and therefore wear excessively. Furthermore such parts as are referred to require reasonably accurate fitting which necessitates machine work that is far too expensive for this class of apparatus.

The objects of the invention are accomplished by means of the novel combination and arrangement of parts to be hereinafter more fully described in connection with the accompanying drawing wherein:

Fig. 1 is a side elevational view of an apparatus embodying the novel features of the invention, Fig. 2 is a sectional elevational view taken on the line 2—2 of Fig. 1, and Fig. 3 is a side elevational view of a modified form of the invention.

Referring to the drawing in detail the novel features of the invention will be described.

The rear end or frame members of a tractor or the like is represented at 2 and the forward end or frame of a trailer is represented at 4. It is usual to pivotally connect the rear end of a tractor and the forward end of a trailer by a fifth-wheel apparatus so that the trailer may be hauled by the tractor. A fifth-wheel as is well known consists of separable engageable parts, one carried by the trailer while the other is carried by the tractor.

In this case for descriptive purposes an upper plate 6 of a fifth-wheel is shown which is fixed to the trailer 4, while a fifth-wheel base plate 8, separable from the plate 6, is resiliently supported by novel mechanism of the invention indicated generally by 10 which is carried by the frame of the tractor at the rear end thereof.

The plates 6 and 8 have parts (not shown) such as an interengaging pin and opening so that they may be pivotally connected together or separated from one another as may be desired. These parts from no part of this invention and need not be herein referred to more in detail.

According to this invention a pair of bracket members 12 are provided which are adapted to rest on and be secured to the frame 2 of a tractor. For this purpose they may include pads 14 which may rest on and be secured to the frame members by means of bolts 16. If desired of course the brackets may be joined together or made integral in order to provide rigidity and strength. Vertically disposed portions 17 intermediate the ends of the brackets have pivoted thereto, as by pins 18, the lower ends of supporting links 20. Preferably the links 20 are bifurcated as shown so as to straddle or embrace the bracket portions 17. If it is desired a single rod may be employed which may extend through the portions 17 of both of the brackets for pivotally connecting both of said links to their respective brackets.

The upper ends of the links are also bifurcated and receive therebetween lugs 22 extending downwardly from the fifth wheel plate 8 as well as intermediate portions of yoke members 24. The lugs and yokes are connected to the upper ends of the links by suitable pins 26 as shown. If desired a single rod or shaft may extend between the links so as to connect both of the lugs and yokes to their respective links.

The yokes 24 are formed to have outwardly extending arm portions 27, the extremities of which are disposed to overlie some portions of the brackets. Preferably said extremities will overlie the pads 14 of the brackets, while compression springs 28 are disposed between said extremities and said pads. The springs 28 may be held in place by means of projections or lugs 30 carried by said arms and pads or if desired in lieu thereof suitable spring seats for receiving the ends of the springs may be employed. It will be desirable in some manner or other to hold the springs against displacement from between the parts while at the same time they will be allowed to flex freely.

As the links 20 are swung back and forth by movements of the plate 8, the yokes are moved thereby so as to act on the springs which resist and cushion the movements of the parts. Lugs 25 projecting from the yokes abut opposite sides of the links to prevent in one way relative movements thereof. In another way, as in Fig. 3, arms 27' extending from opposite sides of a link member 20' are integral so that the arms are moved with the links which are pivoted to the bracket portions 17. This is desirable so that one end of the arms move towards the bracket to compress one spring, while the other end moves away from the brackets.

With the upper and lower plates 6 and 8 pivotally connected together so that a trailer may be hauled about by a tractor any tendency towards relative movements of the tractor and trailer carries sudden shocks and strains. Such shocks and strains tend to injure the parts and the connections therebetween. These shocks, however, according to the novel features of the invention are absorbed or cushioned by the springs. That is, as the trailer and tractor tend to move relative to one another in one direction or the other, the plate 8 swings the links 20 in one direction or the other which moves the arms 24. Any movement of the arms is resisted by the action of the springs 28 so that therefor a movement of the plate 8 in one direction or the other is cushioned or yieldingly resisted whereby shocks and strains are effectively absorbed.

Since the lower plate of the fifth-wheel structure is at all times cushioned against movements in opposite directions the connecting parts of the fifth-wheel members 6 and 8 are relieved of strains and shocks. At the same time by reason of the pivotal connections between the plate 8 and brackets the said plate may readily assume various angular positions as it will when the tractor and trailer move up or down relative to one another.

As distinguished from prior art structures wherein relatively slidable parts are employed, movements of the lower fifth-wheel plate according to this invention are accomplished by its ability to swing while the cushioning action is accomplished by efficient means. By providing parts arranged for swinging movement, frictional action is largely avoided and excessive wear obviated, while at the same time the structure is readily responsive.

Having described the invention in the form at present preferred, what I desire to claim and secure by Letters Patent of the United States is:

1. The combination of a fifth-wheel plate with a mounting therefor comprising, a bracket member, a link pivoted at its lower end to said member for swinging movements, a pivotal connection between the upper end of said link and plate whereby the latter is supported by the former, arms extending from opposite sides of said link and yielding devices at the ends of said arms.

2. The combination of a fifth-wheel plate with a mounting therefor comprising, a pair of link members pivotally connected at their lower ends to a pair of bracket members, pivotal connections between the upper ends of said link members and said plate, arms extending from opposite sides of said link and cushioning, yielding devices disposed between the ends of said arms and said brackets to resist swinging movements of said links.

3. The combination of a fifth-wheel plate with a mounting therefor comprising, a pair of links pivotally connected at their lower ends to bracket portions and at their upper ends to said plate, yokes carried by the upper ends of said links having arms extending from opposite sides thereof and springs disposed between the ends of said arms and other bracket portions.

4. The combination of a fifth-wheel plate with a mounting therefor comprising, a pair of links pivotally connected at their lower ends to bracket portions and at their upper ends to said plate, yokes carried by the upper ends of said links having arms extending from opposite sides thereof and springs disposed between the ends of said arms and other bracket portions, the said links and yokes being held against relative movements by connections associated therewith.

5. The combination of a fifth-wheel plate with a mounting therefor comprising, a pair of link members pivoted to bracket portions and to said plate, arms extending in opposite directions from said link members movable with said link members for operating on cushioning devices at their outer ends.

6. The combination of a fifth-wheel plate with a mounting therefor comprising, a pair of link members pivoted to bracket members and to said plate, arms integral with said link members extending from opposite sides thereof for operatively engaging at their outer ends cushioning mechanism whereby swinging movements of said link in opposite directions may be cushioned.

7. The combination of a fifth wheel plate with a mounting therefor comprising, a bracket member, a link member, pivotal connections between one end of said link member and said bracket member, and between its other end and said plate member, to permit relative swinging and endwise shifting movements of said bracket and plate members and cushioning means associated with certain of said members to cushion relative movements thereof.

8. The combination of a fifth wheel plate with a mounting therefor comprising, a bracket member, a link member, pivotal connections between one end of said link member and said bracket member and between its other end and said plate member, to permit relative swinging and endwise shifting movements of said bracket and plate members, the axes of said pivoted connections being in parallelism, and cushioning means associated with certain of said members to cushion relative movements thereof.

9. The combination of a fifth wheel plate with a mounting therefor comprising, a bracket member, a link member, pivotal connections between one end of said link member and said bracket member and between its other end and said plate member, to permit relative swinging and endwise shifting movements of said bracket and plate members, the axes of said pivotal connections being in parallelism, arms associated with certain of said members, and cushioning means therefor.

10. The combination of a fifth wheel plate with a mounting therefor comprising, a bracket member, a link member, pivotal connections between one end of said link member and said bracket member, and between its other end and said plate member, to permit relative swinging and endwise shifting movements of said bracket and plate members, the axes of said pivoted connections being in parallelism, arms pivoted on certain of said pivotal connections and cushioning means therefor.

11. The combination of a fifth wheel plate with a mounting therefor comprising, bracket members, link members, pivotal connections between one end of said link members and said bracket members, and between their other end and said plate member, to permit relative swinging and endwise shifting movements of said bracket and plate members, the axes of said pivotal connections being in parallelism, arms associated with certain of said members and cushioning means therefor.

12. The combination of a fifth wheel plate with a mounting therefor comprising, bracket members, link members, pivotal connections between one end of said link members and said bracket members and between their other end and said plate member, to permit relative swinging and endwise shifting movement of said bracket and plate members, the axes of said pivotal connections being in parallelism, arms pivoted on certain of said pivotal connections and cushioning means therefor.

In testimony whereof I affix my signature.

CHARLES H. MARTIN.